US012627148B2

(12) United States Patent
Lee

(10) Patent No.: US 12,627,148 B2
(45) Date of Patent: May 12, 2026

(54) MULTI-LEVEL CONVERTER-TYPE STATCOM SYSTEM AND OPERATION METHOD

(71) Applicant: LS ELECTRIC CO., LTD., Anyang-si (KR)

(72) Inventor: Jin Hee Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 352 days.

(21) Appl. No.: 18/273,703

(22) PCT Filed: Jan. 14, 2022

(86) PCT No.: PCT/KR2022/000728
§ 371 (c)(1),
(2) Date: Jul. 21, 2023

(87) PCT Pub. No.: WO2022/164097
PCT Pub. Date: Aug. 4, 2022

(65) Prior Publication Data
US 2024/0106236 A1      Mar. 28, 2024

(30) Foreign Application Priority Data
Jan. 27, 2021    (KR) ........................ 10-2021-0011703

(51) Int. Cl.
*H02J 3/185*       (2026.01)
*H02J 3/1857*      (2026.01)
*H02M 7/483*       (2007.01)

(52) U.S. Cl.
CPC .......... *H02J 3/1857* (2013.01); *H02M 7/483* (2013.01)

(58) Field of Classification Search
None
See application file for complete search history.

(56) References Cited

U.S. PATENT DOCUMENTS 10,560,014 B2 *  2/2020  Chivite-Zabalza ..... H02J 7/345
2016/0231366 A1  8/2016  Choi et al.
(Continued)

FOREIGN PATENT DOCUMENTS

KR      20150075601 A      7/2015
KR      20150130863 A      11/2015
(Continued)

OTHER PUBLICATIONS

Notice of Allowance for related Korean Application No. 10-2021-0011703; action dated Feb. 15, 2024; (7 pages).
(Continued)

*Primary Examiner* — Howard Cortes
(74) *Attorney, Agent, or Firm* — K&L Gates LLP

(57) ABSTRACT

A system including a multi-level converter including a plurality of valve sections including a plurality of sub modules, a plurality of VCU controllers connected to each of the plurality of valve sections, and an upper controller connected to the plurality of VCU controllers, wherein the VCU controller is configured to receive status information from each of the plurality of sub modules to transmit the state information to the upper controller, receive a specific sub module control command information from the upper controller, and transmit the control command information to a specific sub module among the plurality of sub modules.

8 Claims, 8 Drawing Sheets

(56)                      References Cited

U.S. PATENT DOCUMENTS

| 2016/0295712 | A1  | 10/2016 | Kim et al. |
| 2017/0317574 | A1  | 11/2017 | Ding et al. |
| 2018/0083550 | A1* | 3/2018  | Chung ................ H02M 7/5388 |
| 2022/0311328 | A1* | 9/2022  | Tahata .................... H02M 1/32 |

FOREIGN PATENT DOCUMENTS

| KR | 20160053873 | A | 5/2016 |
| KR | 20160098896 | A | 8/2016 |
| KR | 20180097062 | A | 8/2018 |
| KR | 20190065675 | A | 6/2019 |

OTHER PUBLICATIONS

International Search Report for related International Application No. PCT/KR2022/000728; action dated Aug. 4, 2022; (3 pages).
Written Opinion for related International Application No. PCT/KR2022/000728; action dated Aug. 4, 2022; (4 pages).
Office Action for related Korean Application No. 10-2021-0011703; action dated May 16, 2023; (4 pages).

* cited by examiner

MULTI-LEVEL CONVERTER-TYPE STATCOM SYSTEM AND OPERATION METHOD

CROSS-REFERENCE TO RELATED APPLICATION

This application is a National Stage of International Application No. PCT/KR2022/000728, filed on Jan. 14, 2022, which claims priority to and the benefit of Korean Patent Application No. 10-2021-0011703, filed on Jan. 27, 2021, the disclosure of which is incorporated herein by reference in its entirety.

FIELD

The present disclosure relates to an MMC-type STATCOM system and an operating method thereof.

BACKGROUND

A flexible power transmission system or new power transmission system (FACTS, Flexible AC Transmission System) is an operating technology that increases the flexibility of a power system by introducing a power electronic control technology to an AC power system. Specifically, the flexible power transmission system may control transmitted power using a power semiconductor switching device.

Such a flexible power transmission system can maximize facility utilization of transmission lines, increase transmission capacity, and minimize voltage fluctuation.

Among FACTS devices, STATCOM (Static Synchronous Compensator) is a facility that has the function of improving voltage stability and increasing power transmission capacity by compensating for reactive power connected in parallel to the line.

Initially, STATCOM's converters were developed based on 2-level or 3-level converters, but had problems such as the limitation of large-capacity power transmission and high switching loss. Since then, the development of large-capacity IGBT device and the introduction of modular multi-level converters (MMCs) have made it possible to transmit large-capacity power.

The MMC forms a step-shaped sinusoidal voltage by connecting modular half-bridge or full-bridge inverters in series. Accordingly, large-capacity power transmission is possible by adjusting the number of sub modules connected in series.

Meanwhile, in the case of the MMC-STATCOM system, an optical cable must be connected from VBE (Valve Base Electronic) corresponding to the upper controller to a valve configured to N serially connected sub modules.

In this case, if the number of optical cables increases and the distance from VBE increases, a product with high optic-power or a cable with low optical loss should be selected. Accordingly, there is a disadvantage in that cost and installation and manufacturing time are increased.

In addition, when upgrading the software of each SMI (Sub module Interface) of the existing valve, there is an inconvenience in that each sub module must be downloaded.

In this case, there is a problem that increases the physical time that occurs during software upgrade and greatly affects the safety of workers.

SUMMARY

The purpose of the present disclosure is to simplify the existing control system structure with an intermediate controller linked to the sub module controller (SMI) of the valve of the MMC-STATCOM system, and is to implement addition/enhance the functions of the converter power converter.

According to an embodiment of the present disclosure, a system including a multi-level converter including a plurality of valve sections including a plurality of sub modules, a plurality of VCU controllers connected to each of the plurality of valve sections, and an upper controller connected to the plurality of VCU controllers, wherein the VCU controller is configured to receive status information from each of the plurality of sub modules to transmit the state information to the upper controller, receive a specific sub module control command information from the upper controller, and transmit the control command information to a specific sub module among the plurality of sub modules.

Wherein the upper controller may receive state information of each of a plurality of sub modules from the VCU controller and generate specific sub module control command information to transmit the specific sub module control command information to the VCU controller.

Wherein a space may be formed between each of the plurality of valve sections and a ground, the VCU controller may be disposed in the space.

Wherein the VCU controller may be disposed on one side of a valve section.

According to an embodiment of the present disclosure, a cable connection structure can be simplified by separately operating VCU controllers for each phase.

According to an embodiment of the present disclosure, by separately operating a VCU controller for each phase, it is possible to reduce data processing load and perform protection function through quick response.

According to an embodiment of the present disclosure, efficiency in inspection and maintenance can be improved by separately operating the VCU controller for each phase.

According to the embodiment of the present disclosure, by separately operating the VCU controller for each phase, when an event occurs during MMC-STATCOM system operation, it is possible to analyze the cause of the event situation because the status/data/information before and after the accident can be stored in the VCU controller and the data can be checked from the outside.

According to an embodiment of the present disclosure, when configuring a mobile MMC-STATCOM or container STATCOM system, a compact type system configuration can be implemented by installing a VCU controller in an empty space of a valve.

BRIEF DESCRIPTION OF THE DRAWINGS

FIG. 4 is a diagram illustrating a STATCOM configuration including a VCU controller according to an embodiment of the present disclosure.

DETAILED DESCRIPTION

Figure 1:
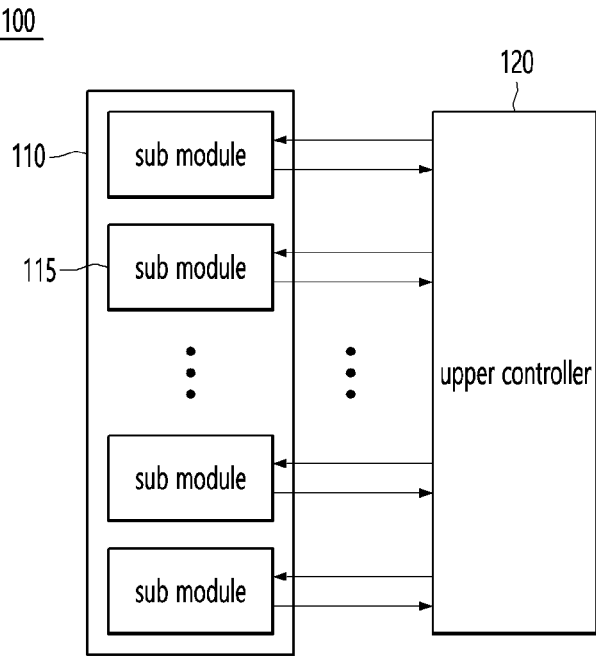
FIG. 1 is a diagram showing the configuration of an MMC-type voltage-type high-voltage direct current transmission system according to a conventional embodiment.

Hereinafter, the details of this disclosure are demonstrated.

The embodiment described below is only one example of the present disclosure, and the present disclosure can be modified in various forms. Accordingly, the specific structures and functions disclosed below do not limit the scope of the claim.

Hereinafter, the embodiments disclosed in this specification will be described in detail with reference to the accompanying drawings, but the same or similar elements are given the same reference numerals regardless of reference numerals, and redundant description thereof will be omitted. The suffixes "module" and "unit" for components used in the following description are given or used together in consideration of ease of writing the specification, and do not have meanings or roles that are distinct from each other by themselves. In addition, in describing the embodiments disclosed in this specification, if it is determined that a detailed description of a related known technology may obscure the gist of the embodiment disclosed in this specification, the detailed description thereof will be omitted. In addition, the accompanying drawings are only for easy understanding of the embodiments disclosed in this specification, the technical idea disclosed in this specification is not limited by the accompanying drawings, and all changes included in the spirit and technical scope of the present disclosure, it should be understood to include equivalents or substitutes.

Terms including ordinal numbers, such as first and second, may be used to describe various components, but the components are not limited by the terms. These terms are only used for the purpose of distinguishing one component from another.

It is understood that when an element is referred to as being "connected" or "connected" to another element, it may be directly connected or connected to the other element, but other elements may exist in the middle. It should be. On the other hand, when an element is referred to as "directly connected" or "directly connected" to another element, it should be understood that no other element exists in the middle.

Figure 2:
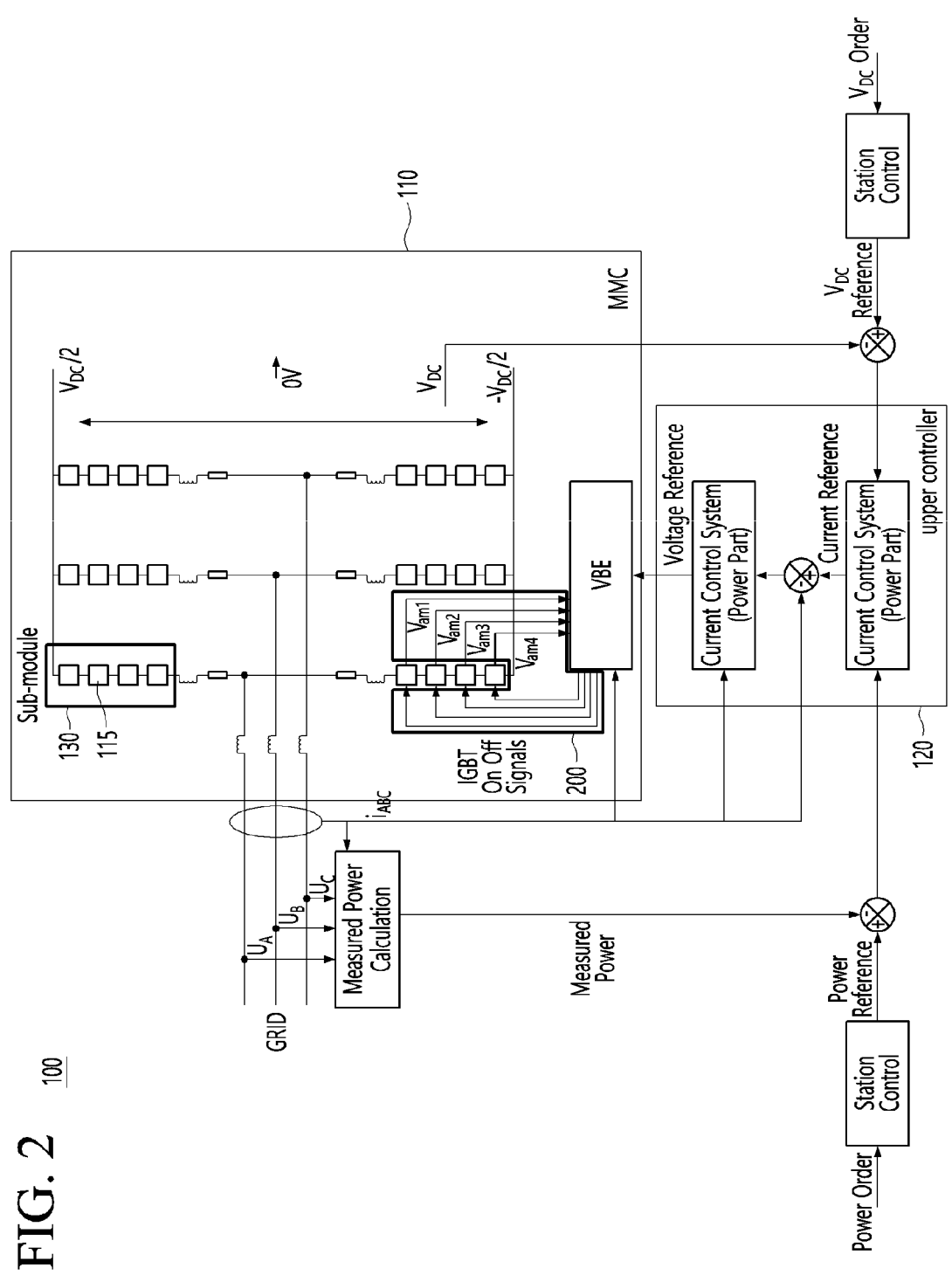
FIG. 2 is a diagram showing the configuration of a conventional MMC-type STATCOM.

FIG. 1 is a diagram showing the configuration of an MMC-type voltage-type high-voltage direct current transmission system according to a conventional embodiment. FIG. 2 is a diagram showing the configuration of STATCOM of the conventional MMC method.

The MMC-type STATCOM 100 may be a reactive power compensation device that converts current using a modular multi-level converter (MMC). STATCOM (100) of the MMC method may be configured to multiple (tens to hundreds) of sub modules, collect status information of sub modules within a short control period (ex, 100 us to 200 us), and determine a sub module to be turned on/off in the next control period.

As shown in FIG. 1, the MMC type STATCOM 100 may include a modular multi-level converter 110 and an upper controller 120.

The modular multi-level converter 110 may convert DC to AC or AC to DC by switching the plurality of sub modules 115. To this end, the modular multi-level converter 110 may control turn-on and turn-off timing of the sub module 115.

The conventional modular multi-level converter 110 may include a plurality of sub modules 115 and a Sub module Interface (SMI) 114 included in each sub module to transmit a control command and a valve base included in the upper controller 120 Electronics (VBE, 113), etc.

Referring to FIG. 2, a plurality of sub modules 115 may be connected in series. In this case, a plurality of sub modules connected to the positive electrode or the negative electrode of any one phase constituting the 3-phase may constitute one arm 130. Arm 130 may be named a valve according to an embodiment.

According to one embodiment, the modular multi-level converter 110 is a 3-phase MMC and may be configured to 6 arms. Specifically, it may be configured to 6 arms including positive electrode (+) and negative electrode (−) for each of the three phases A, B, and C.

Referring to FIG. 2, the modular multi-level converter 110 includes a first arm configured to a plurality of sub modules 115 for the A-phase negative electrode and 2nd arm configured to a plurality of sub modules 115 for the A-phase negative electrode, 3rd arm configured to a plurality of sub modules 115 for B-phase positive electrode, 4th arm configured to a plurality of sub modules 115 for B-phase negative electrode, a fifth arm configured to a plurality of sub modules for C-phase positive electrode and a sixth arm a fifth arm a plurality of sub modules for the C-phase negative electrode.

In this case, a plurality of sub modules for one phase may constitute a leg. Specifically, a plurality of sub modules for positive and negative electrodes included in one phase may constitute a leg.

In FIG. 2, the modular multi-level converter 110 may include a phase A leg configured to a plurality of sub modules for phase A, a phase B leg configured to a plurality of sub modules for phase B, and a C-phase leg configured to a plurality of sub modules for phase C.

Each of the arm and leg configured to a plurality of sub modules 115 may be connected to three phases of the power system, that is, phase A, phase B, and phase C, respectively.

According to another embodiment, the plurality of sub modules 115 may constitute a positive electrode arm (not shown) and a negative electrode arm (not shown) according to polarity.

The VBE may receive command for controlling the sub module from the upper controller 120 and transmit them to the sub modules, and may be one controller connected to a plurality of sub modules.

The upper controller 120 may control overall operations of the MMC-type high-voltage DC power transmission system 100.

According to an embodiment, the upper controller 120 may be a Control and Protection (C&P) system that performs operations for controlling and protecting the HVDC system. In addition, although VBE and upper controller 120 are separately shown in the drawing, the upper controller 120 may be a concept including VBE.

In this case, the upper controller 120 may be connected to each of a plurality of sub modules.

Figure 3:
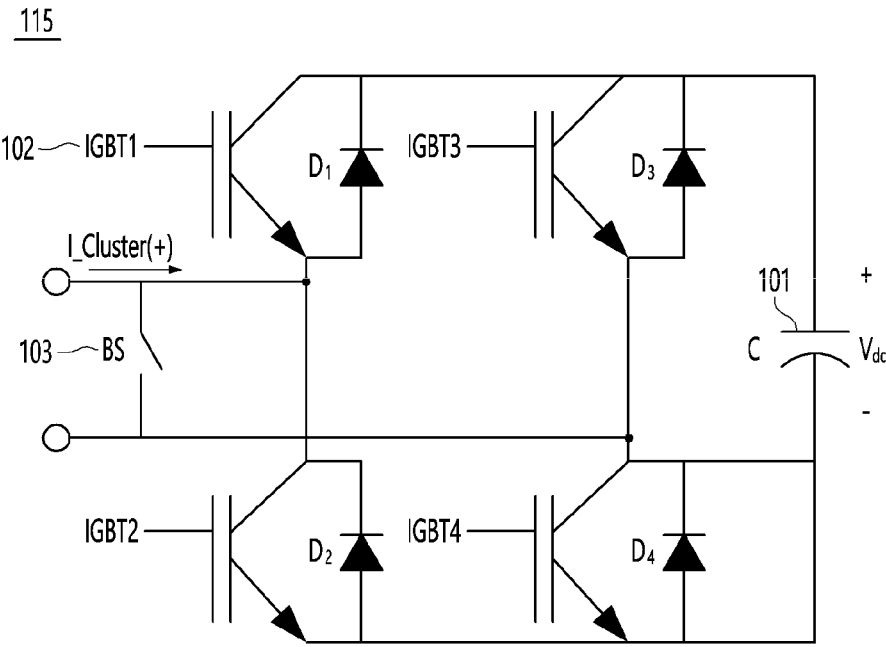
FIG. 3 is a diagram showing a detailed structure of a sub module included in a modular multi-level converter.

FIG. 3 is a diagram showing a detailed structure of a sub module included in a modular multi-level converter.

The sub module 115 included in the modular multi-level converter 110 may include a capacitor for storing power energy, a power semiconductor device, a switching device, and a protection circuit.

The sub module 115 is configured to one capacitor 101 and four IGBT elements 102. A plurality of sub modules 115 are connected in series to form one phase. The plurality of sub modules 115 can control the IGBT by receiving ON/OFF control commands from the VBE or other upper controller 120.

The size of the capacitor may be set in proportion to the size of the modular multi-level converter 110. The capacitance of a capacitor may be proportional to the square of the voltage.

Accordingly, an appropriate operating voltage of the sub module 115 may be set in consideration of this.

The protection switch 103 is a switch for protecting the sub module 115. The protection switch may be implemented as a By-Pass switch.

In general, the modular multi-level converter 110 is designed with sufficient redundancy in order to prevent the system from being stopped due to a failure of one sub module 115.

Accordingly, the bypass switch 103 bypasses the failed sub module 115 and allows the redundant sub module 115 to operate.

Among the plurality of sub modules according to an embodiment of the present disclosure, the n-th sub module (Module n) is serially connected to the n−1-th sub module (Module n−1) and the n+1-th sub module (Module n+1).

In this case, the current input from the n-lth sub module (Module n−1) flows to the n+1-th sub module (Module n+1) through the n-th sub module (Module n).

Hereinafter, a system according to an embodiment of the present disclosure will be described with reference to FIGS. 4 to 7.

Referring to the modular multi-level converter system according to an embodiment of the present disclosure may include the following configuration.

Figure 4:
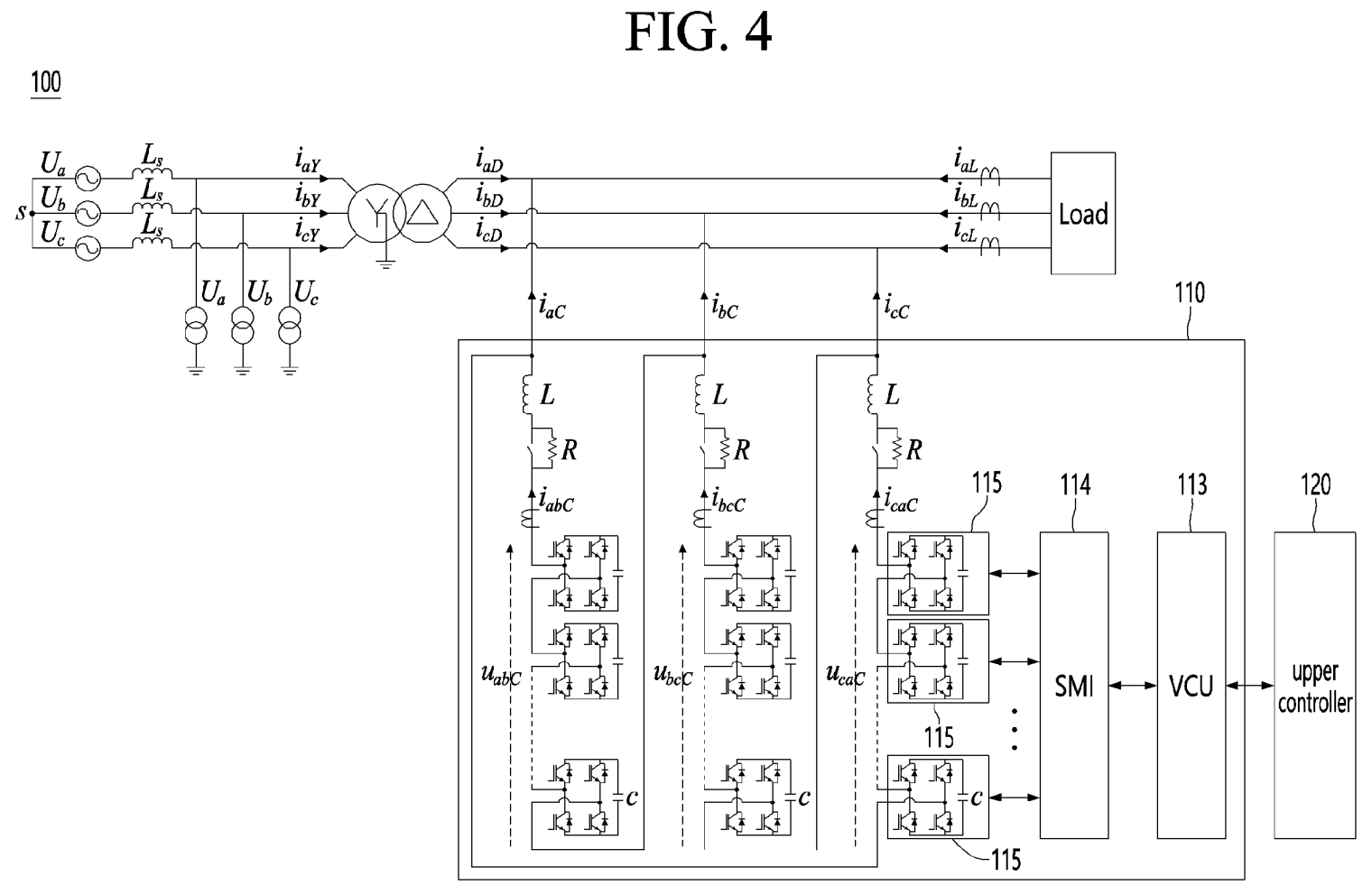
Figure 5:
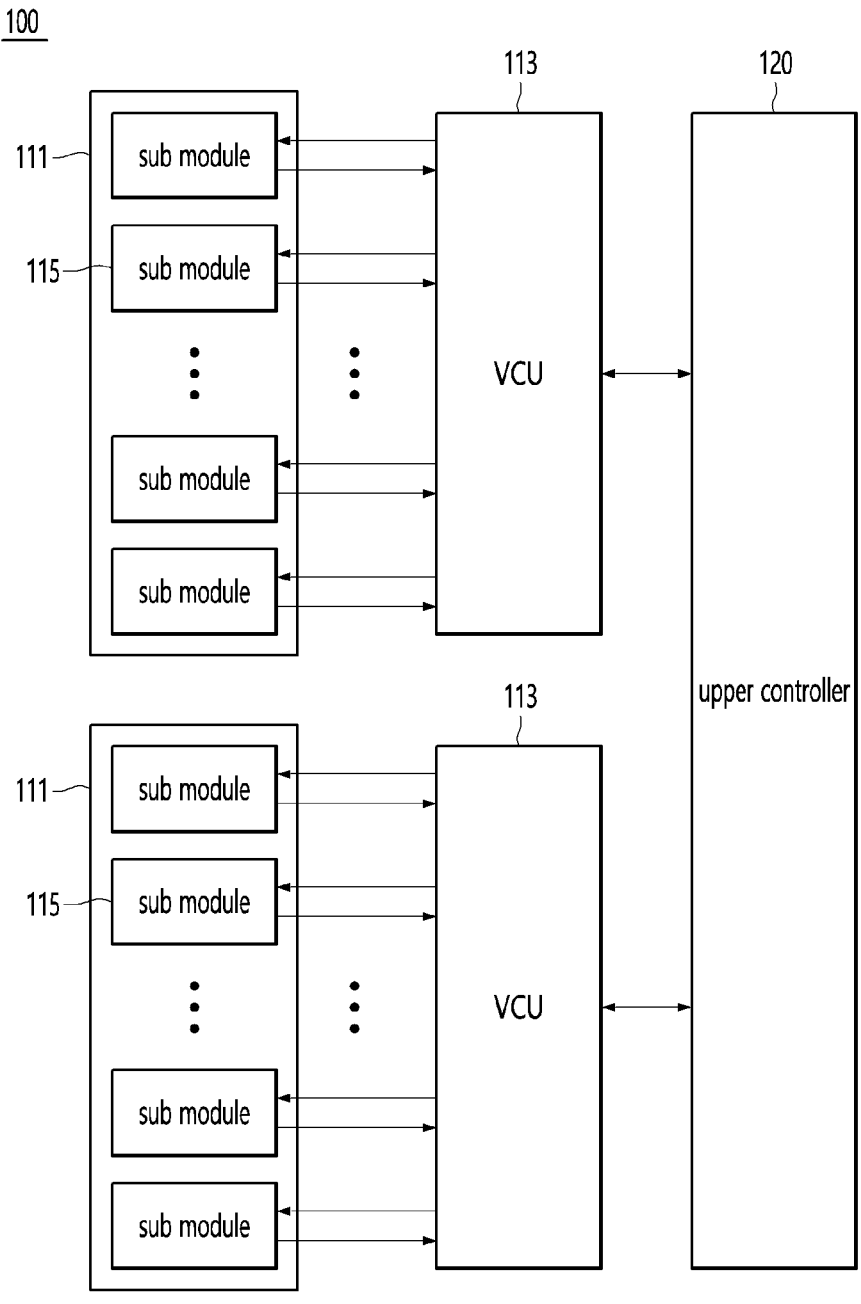
FIG. 5 is a block diagram of a system including a VCU controller according to an embodiment of the present disclosure.

FIG. 4 is a diagram showing a system according to an embodiment of the present disclosure, and FIG. 5 is a schematic block diagram illustrating a system according to an embodiment of the present disclosure.

Referring to FIG. 4, a plurality of sub modules 115 may be connected in series. In this case, a plurality of sub modules 115 connected to any one phase constituting a 3-phase may constitute one cluster. A cluster may be named a valve section according to an embodiment.

According to one embodiment, the modular multi-level converter 110 is a 3-phase MMC and may be configured to 3 clusters. Specifically, each of the three phases A, B, and C may be configured to an A-phase cluster, a B-phase cluster, and a C-phase cluster.

A cluster configured to a plurality of sub modules 115 may be connected to three phases of the power system, that is, phase A, phase B, and phase C, respectively.

A sub module interface (SMI) 114 is connected to a plurality of sub modules 115 and receives state information of the sub module from the sub module. At this time, it is also possible that the SMI is provided in each of a plurality of sub modules.

The VCU (Valve Connection Unit) controller 113 may receive a command for controlling the sub module 115 from the upper controller 120 and transmit it to the sub module 115 or the SMI 114.

The upper controller 120 can control the overall operation of the MMC-type STATCOM 100. According to an embodiment, the upper controller 120 may be a Control and Protection (C&P) system that performs operation for controlling and protecting STATCOM.

Specifically, referring to FIG. 5, in the MMC-type STATCOM 100, the modular multi-level converter 110 may include a plurality of valve sections including a plurality of sub modules, a VCU controller 113 connected to each of sub modules included in the plurality of valve sections and an upper controller 120.

At this time, each of the plurality of valve sections 111 includes a plurality of sub modules, and the VCU controller 113 may be included in the sub module and be connected to a Sub module Interface (SMI) 114 that transmits control commands.

In addition, each of the plurality of valve sections may be connected to the VCU controller 113, and one VCU controller may be provided per unit valve section.

The plurality of valve sections may include a plurality of sub modules, and each of the plurality of sub modules included in the valve section may be connected in series.

Also, each of the plurality of sub modules and the VCU controller 113 may be connected.

According to an embodiment of the present disclosure, by constructing the system as shown in FIG. 4, the overall control of the MMC-STATCOM system is overseen by the upper controller 120 at the C&P level, and the valve control command value and valve information may be communicated with the upper controller through the provided VCU (Valve Connection Unit) provided for each phase instead of the existing VBE, and be operated the multi-level converter through the sub module controller, SMI (Sub module Interface).

Figure 6:
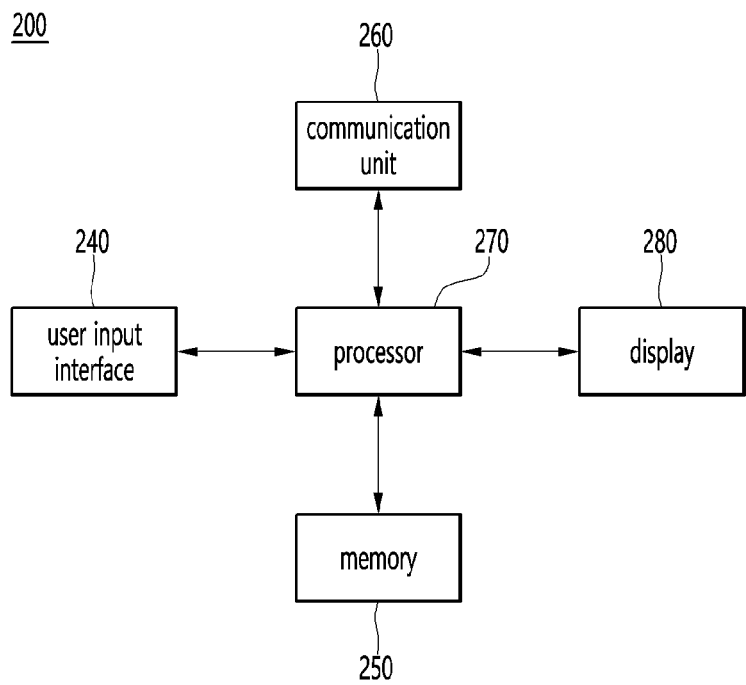
FIG. 6 is a block diagram showing the configuration of a VCU controller according to an embodiment of the present disclosure.

A specific block control diagram of the VCU controller is described in FIG. 6.

FIG. 6 is a control block diagram of a VCU controller according to an embodiment of the present disclosure.

A VCU controller 200 according to an embodiment of the present disclosure may include at least some or all of the user input interface 240, the memory 250, the communication unit 260, the processor 270, and the display 280.

According to an embodiment of the present disclosure, the communication unit 260 of the VCU controller 200 may perform data processing through communication with a plurality of sub module units (valve sections) and an upper controller, and communication for transmitting control command value to the sub module.

Specifically, the processor 270 of the VCU controller may control the overall operation of the VCU controller.

The processor 270 of the VCU controller may collect state information and sensing information of each sub module of the valve section connected to the VCU controller and process data.

In addition, it can communicate with the upper controller or VBE to receive command related to sub module control and transmit the command to sub modules included in the valve section.

In addition, information of sub modules included in the valve section may be transmitted to the upper controller.

In addition, if software upgrade is required for a plurality of sub modules included in the valve section, the processor 270 of the VCU controller may transmit a program required for software upgrade of the sub module included in the valve section to the corresponding sub module.

In addition, the processor 270 of the VCU controller may store state data of each sub module through the memory 250 when an event occurs in the sub module included in the valve section.

As described above, a device called VCU (Valve Connection Unit) between the existing C&P and valve replaces the VBE by providing a VCU controller in each valve section instead of one VBE and one upper control provided in the existing multi-level converter and at the same time, as each phase is added, the physical interface will be simplified.

In addition, since a VCU controller is provided for each phase, only necessary data is communicated through C&P data after data processing of a unit sub module, so that data processing load can be reduced as compared to VBE in the existing system.

In addition, since the processor of the VCU controller can quickly perform protection function through collection/processing/determination of status information and sensing information of sub modules, it will be possible to strengthen the protection function of sub module and monitor them through display.

In addition, when upgrading Sub module Controller (SMI: Sub module Interface) S/W, software maintenance and maintenance will become possible as functions are added through the transfer of necessary program.

In addition, the processor of the VCU controller will be able to save data by implementing an interface through external communication and saving state data through memory when a Valve event occurs.

Figure 7:
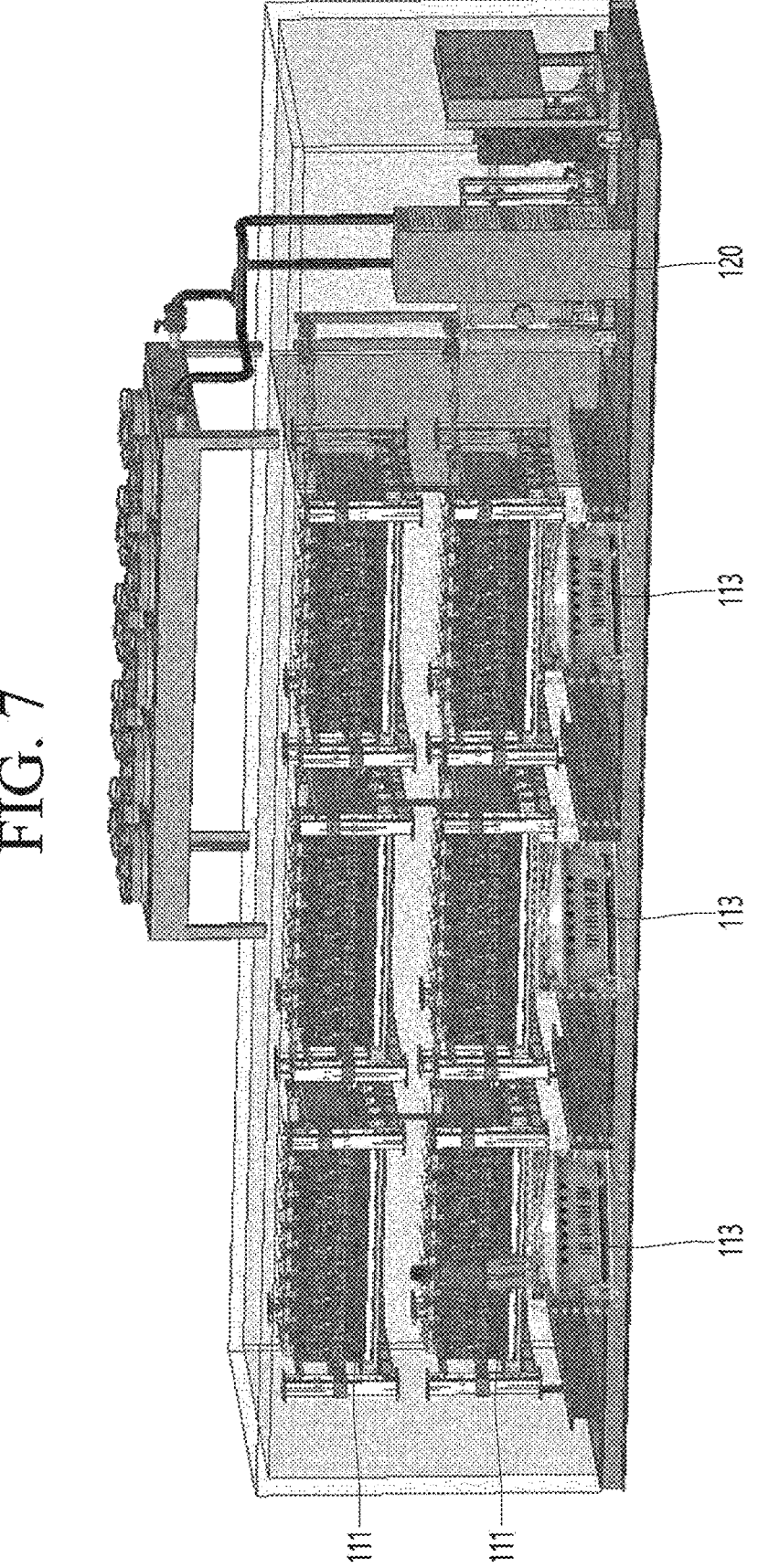
FIG. 7 is a diagram showing a compact STATCOM system equipped with a VCU controller according to an embodiment of the present disclosure.
Figure 8:

FIG. 7 is a diagram showing the arrangement of VCU controllers in a system according to an embodiment of the present disclosure.

Referring to FIG. 7, in the system according to an embodiment of the present disclosure, a space may be formed between each of the multi-level converters and the ground.

The corresponding space may be a space formed to prevent grounding and short circuit between the ground and the multi-level converter.

A VCU controller according to an embodiment of the present disclosure may be disposed in a space formed between a valve section included in a multi-level converter and the ground.

Specifically, each of the VCU controllers may be disposed in a space formed between each of the plurality of valve sections and the ground.

The VCU controller 113 according to another embodiment of the present disclosure may be disposed on one side of the valve section 111.

As shown in FIG. 7, by arranging the VCU controller 113 in the space formed between the valve section 111 and the ground or on one side of the multi-level converter, a mobile STATCOM system can be built, and a container type STATCOM system can also be built.

Therefore, when constructing and manufacturing the MMC-STATCOM system as well as the STATCOM system, which previously required a large space, as a mobile or compact container, the system can be built without constraints on space utilization of control system devices.

In addition, although services and embodiments have been described above, these are merely examples and do not limit the present disclosure, and those skilled in the art to which the present disclosure belongs to the scope that does not deviate from the essential characteristics of the present services and embodiments. It will be appreciated that various modifications and applications not exemplified above are possible. For example, each component specifically shown in the embodiments can be modified and implemented. And differences related to these variations and applications should be construed as being included in the scope of the present disclosure as defined in the appended claims.

The invention claimed is:

1. A system including a multi-level converter including a plurality of valve sections including a plurality of sub modules, a plurality of Valve Connection Unit (VCU) controllers connected to each of the plurality of valve sections, and an upper controller connected to the plurality of VCU controllers,
   wherein each VCU controller of the plurality of VCU controllers is configured to:
   receive status information from each of the plurality of sub modules to transmit the status information to the upper controller,
   receive control command information for a specific sub module of the plurality of sub modules from the upper controller,
   transmit the control command information to the specific sub module among the plurality of sub modules,
   check whether a software upgrade is required for the plurality of sub modules included in a corresponding valve section, and
   transmit a program required for the software upgrade to each sub module in the corresponding valve section through a sub module controller disposed between the plurality of sub modules and the VCU controller.

2. The system of claim 1, wherein the plurality of valve sections including the plurality of sub modules performs power on/off operation of the specific sub module in response to the control command information when the control command information is received through the VCU controller.

3. The system of claim 1, wherein the upper controller receives the status information of each of the plurality of sub modules from the VCU controller and generates the control command information for the specific sub module to transmit the control command information to the VCU controller.

4. The system of claim 1, wherein a space is formed between each of the plurality of valve sections and a ground, wherein the VCU controller is disposed in the space.

5. The system of claim 1, wherein the VCU controller is disposed on one side of a valve section.

6. A Valve Connection Unit (VCU) controller connected to a multi-level converter including a plurality of valve sections including a plurality of sub modules, and each of the plurality of valve sections,
   wherein the VCU controller is configured to:
   receive status information from each of the plurality of sub modules to transmit the status information to an upper controller, in communication with the VCU controller,
   receive control command information for a specific sub module of the plurality of sub modules from the upper controller,
   transmit the control command information to the specific sub module among the plurality of sub modules,
   check whether a software upgrade is required for the plurality of sub modules included in a corresponding valve section of the plurality of valve sections, and
   transmit a program required for the software upgrade to each of the sub modules through a sub module controller disposed between the plurality of sub modules and the VCU controller.

7. The VCU controller of claim 6, wherein a space is formed between each of the plurality of valve sections and a ground, wherein the VCU controller is disposed in the space.

8. The VCU controller of claim 6, wherein the VCU controller is disposed on one side of a valve section.

* * * * *